(12) United States Patent
Jiang et al.

(10) Patent No.: US 11,796,789 B2
(45) Date of Patent: Oct. 24, 2023

(54) PINNED APERTURE LIGHT MODULATOR AND METHOD

(71) Applicant: Wisconsin Alumni Research Foundation, Madison, WI (US)

(72) Inventors: Hongrui Jiang, Madison, WI (US); Alireza Ousati Ashtiani, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 104 days.

(21) Appl. No.: 17/009,231

(22) Filed: Sep. 1, 2020

(65) Prior Publication Data

US 2022/0066194 A1 Mar. 3, 2022

(51) Int. Cl.
*G02B 26/00* (2006.01)
*G02B 26/02* (2006.01)

(52) U.S. Cl.
CPC .......... *G02B 26/02* (2013.01); *G02B 26/004* (2013.01)

(58) Field of Classification Search
CPC .............................. G02B 26/02; G02B 26/004
USPC .................... 359/228, 290, 291, 295, 886
See application file for complete search history.

(56) References Cited

U.S. PATENT DOCUMENTS

| 8,072,688 | B2 | 12/2011 | Krupenkin |
| 10,379,340 | B1 * | 8/2019 | Robertus Van Lier .. G09G 3/38 |
| 2007/0031097 | A1 * | 2/2007 | Heikenfeld ............ G02B 26/02 362/600 |
| 2012/0295058 | A1 | 11/2012 | Brosnihan et al. |

FOREIGN PATENT DOCUMENTS

| EP | 2282226 A1 * | 2/2011 | ........... G02B 26/005 |
| WO | WO-2020087028 A1 * | 4/2020 | ........... G02B 26/004 |

OTHER PUBLICATIONS

Jian Li et al., "DRIE-Fabricated Curved-Electrode Zipping Actuators With Low Pull-in Voltage," Transducers '03, 2th International Conference on Solid-State Sensors, Actuators and Microsystems, Boston, Jun. 8-12, 2003, pp. 480-483.

(Continued)

*Primary Examiner* — Mahidere S Sahle
(74) *Attorney, Agent, or Firm* — Boyle Fredrickson, S.C.

(57) ABSTRACT

A light modulator and method of forming the same is provided. The light modulator includes a membrane and a tuning electrode in spaced relation to the membrane. A light blocking fluid is received between the substrate and the tuning electrode and a light blocker is positioned between the tuning electrode and a central portion of the membrane. A pinning electrode is disposed between the light blocker and the membrane and is aligned with the central portion of the membrane. An electrostatic generator is configured to selectively apply an electrostatic force on the membrane causing the central portion of the membrane to deform towards pinning electrode causing the light blocking fluid to be displaced from between the membrane and the pinning electrode. A variable electrostatic generator is configured to selectively apply a variable electrostatic force on the membrane causing an outer portion of the membrane to deform towards the tuning electrode and causing the light blocking fluid to be displaced from between the outer portion of the membrane and the tuning electrode.

27 Claims, 4 Drawing Sheets

(56) References Cited

OTHER PUBLICATIONS

C. Divoux et al., "A Novel Electrostatic Actuator For Micro Deformable Mirrors: Fabrication And Test," Tranducers '03, 12th International Conference on Solid-State Sensors, Actuators and Microsystems, Boston, Jun. 8-12, 2003, pp. 488-491.

L. Maffli et al., "Mm-size bistable zipping dielectric elastomer actuators for integrated microfluidics," Proc. SPIE, vol. 8687, 86872M, Apr. 9, 2013, 2013.

A. Ousati Ashtiani et al., "An Electrohydrodynamically Actuated Liquid Microlens With Areal Density Modulated Electrodes," Transducers 2015, Anchorage, Alaska Jun. 21-25, 2015, pp. 2089-2092.

A. Ousati Ashtiani et al., "Design and fabrication of an electrohyrodynamically actuated microlens with areal density modulated electrodes," Journal of Micromechanics and Microengineering, 26 (2016) 015004 (9pp).

\* cited by examiner

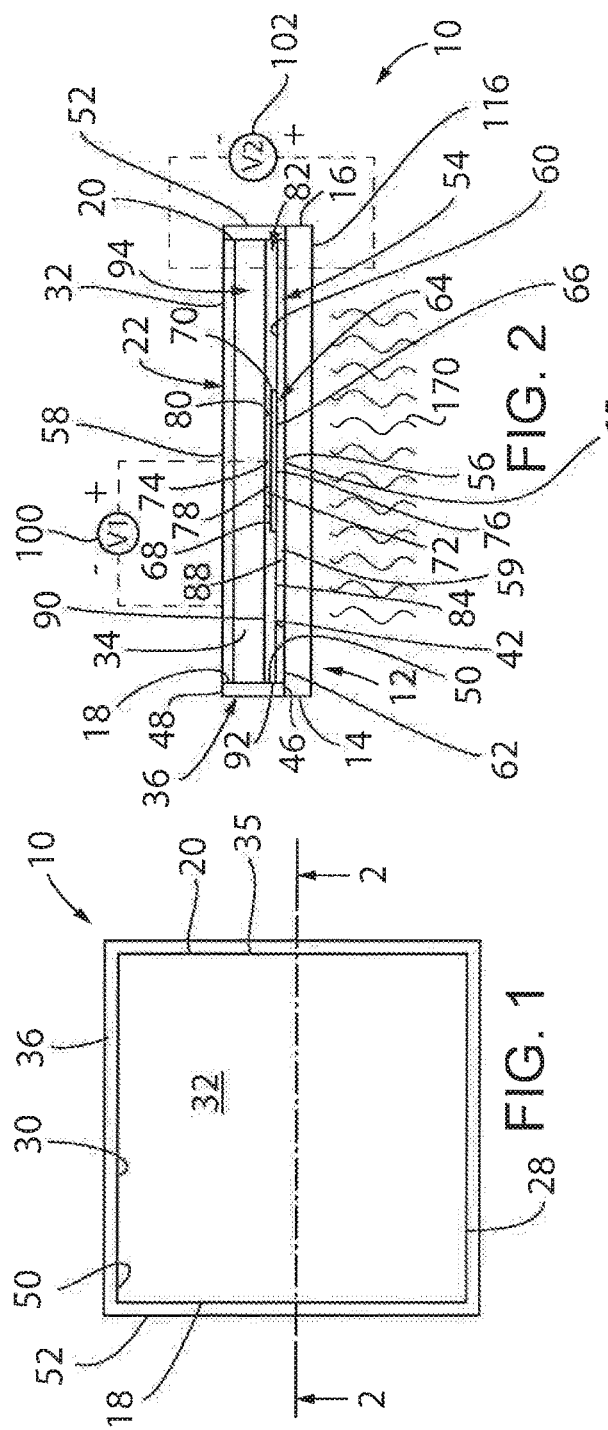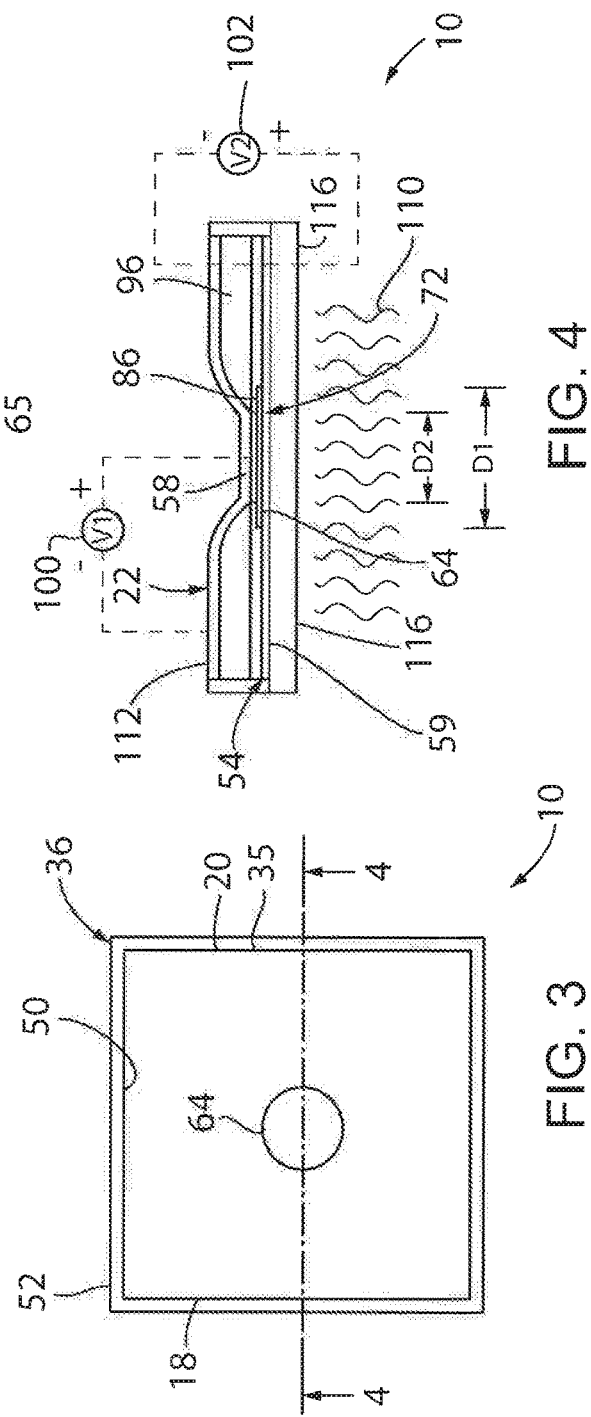

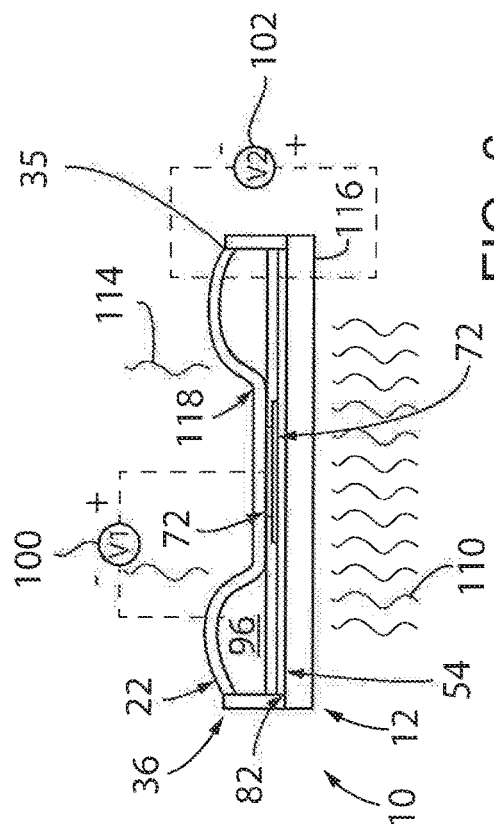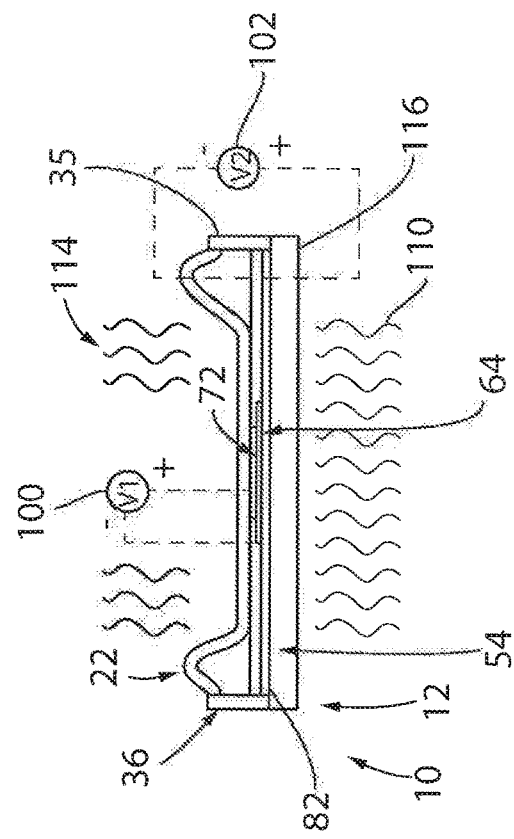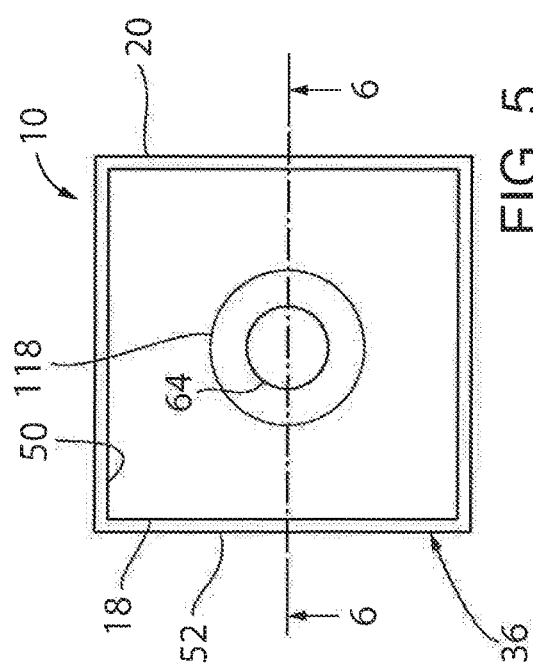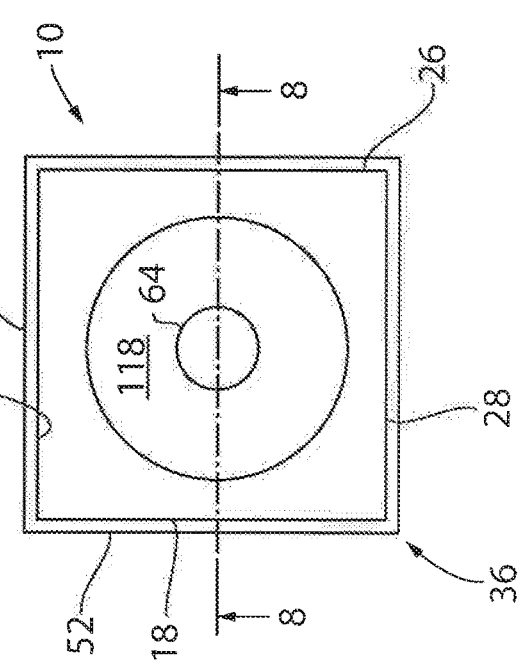

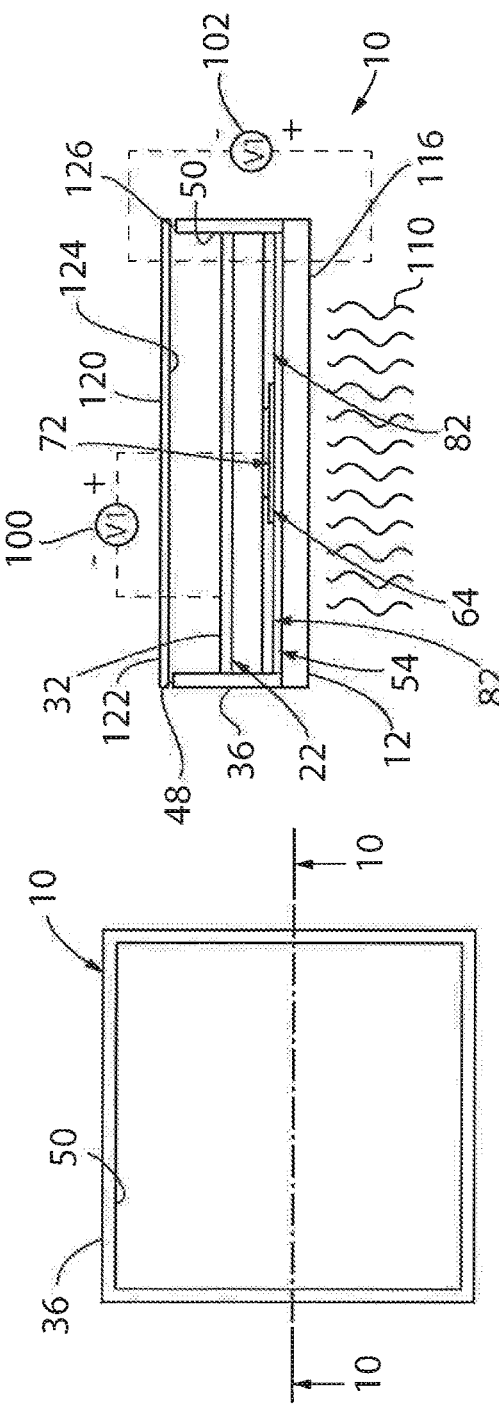
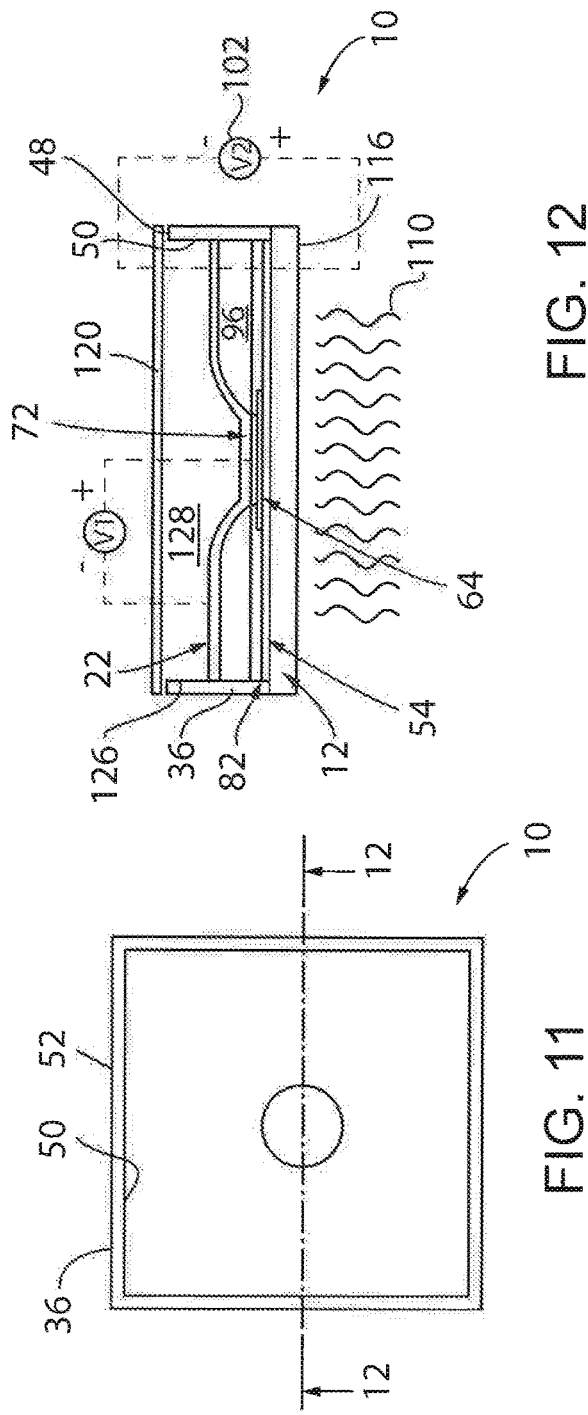

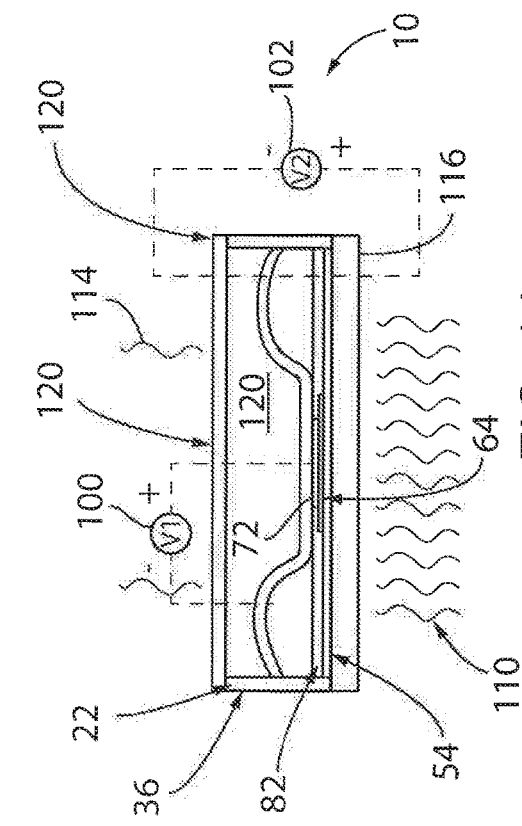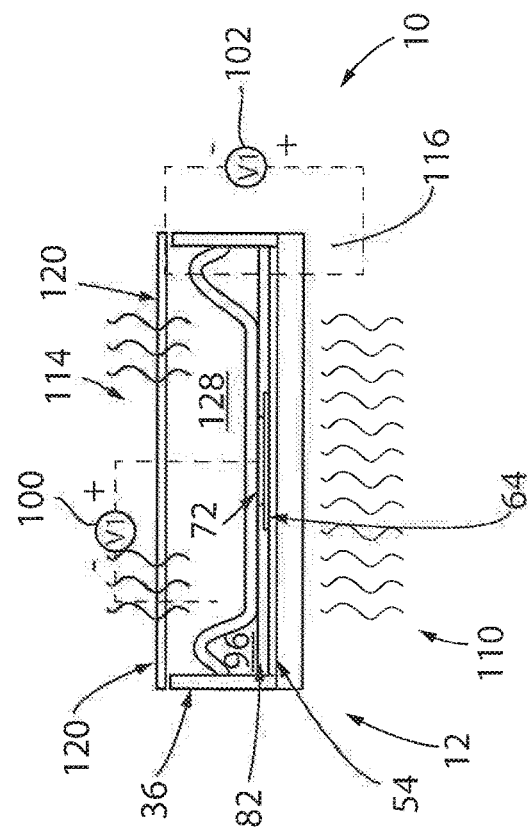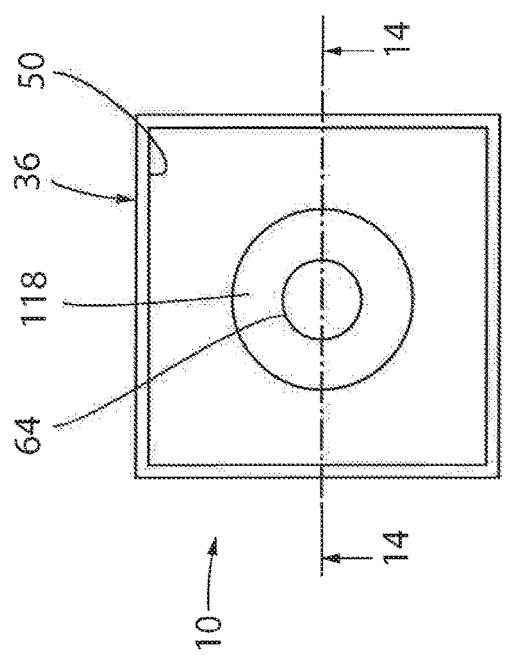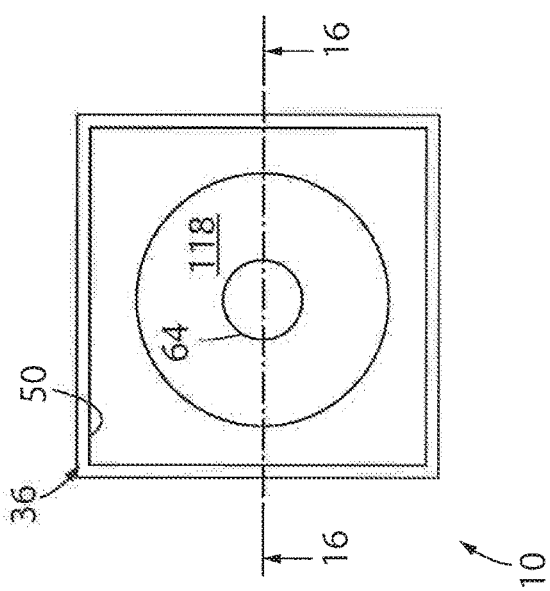

PINNED APERTURE LIGHT MODULATOR AND METHOD

REFERENCE TO GOVERNMENT GRANT

This invention was made with government support under EB019460 awarded by the National Institutes of Health. The government has certain rights in the invention.

FIELD OF THE INVENTION

This invention relates generally to light modulators, and in particular, to a pinned aperture light modulator which produces an improved contrast ratio over prior light modulators.

BACKGROUND AND SUMMARY OF THE INVENTION

Luminance is a metric used to measure the intensity of light present on a surface which is expressed typically in candelas per square meter ($cd/m^2$). It is often used in the video industry to characterize the brightness of a display. More specifically, each display will have a contrast ratio which is considered to be the ratio between the luminance of the brightest white and the darkest black that the display. Typically, a display having a higher contrast ratio reproduces images with deeper blacks, thereby improving the overall picture quality. Consequently, it can be appreciated that a high contrast ratio is a desired property of any display.

In view of the foregoing, it can be appreciated that realizing a very high contrast ratio is the holy grail of non-self-emissive display devices, since a very high contrast ratio would result in a high dynamic range (HDR) and good black reproduction produced by the display. To this end, improvement in the contrast ratios of displays, such as liquid crystal display (LCD) panels, have been pursued such that contrast ratios of approximately 2000:1 are now common. However, contrast ratios of approximately 2000:1 are not great enough for future generation HDR displays which need at least a dynamic range of 20,000:1. As such, new mechanisms which allow for displays to realize very high contrast ratios is highly desirable.

Heretofore, a hybrid electrostatic actuator has been developed for use in a light valve for displays. More specifically the light valve includes a transparent, compliant membrane spaced from a substrate corresponding in size and shape. A first fluid chamber is provided between the lower surface of the membrane and the upper surface of substrate and is adapted by receiving a light absorbing dielectric ink therein. A second fluid chamber is provided between the upper surface of the membrane and a transparent cover and is adapted by receiving a transparent conductive fluid, such as salinized water, therein. In operation, it can be understood that the light absorbing dielectric ink in the first fluid chamber of the light valve blocks all light rays incident on the substrate from passing therethrough. However, by applying a voltage between an electrode and the fluid, in the second fluid chamber portion, an electrostatic force is exerted on the portion of the membrane axially aligned with the center of electrode, thereby causing the pull-in of the membrane toward the upper surface of the substrate. As the membrane collapses onto the upper surface of the substrate, the membrane urges the light absorbing dielectric ink from the central portion of the first fluid chamber, thereby providing a transparent area within the light valve and allowing light rays incident on the substrate and aligned with the transparent area to pass therethrough.

While functional for its intended purpose, it has been found that the transitions from "off" to "on" in light valves incorporating hybrid electrostatic actuators are not smooth due to the "snapping" or zipping effect of the membrane. As such, the light rays incident on the substrate adjacent the transparent area passes through the light valve. This, in turn, reduces the contrast ratio exhibited by the light valve.

In view of the foregoing, it is a primary object and feature of the present invention to provide a light modulator that produces an improved contrast ratio over prior light modulators.

It is a further object and feature of the present invention to provide a light modulator that may be used in connection with HDR displays, LCD panels and electrowetting displays.

It is a still further object and feature of the present invention to provide a light modulator that is simple and inexpensive to fabricate.

In accordance with present invention, a light modulator is provided. The light modulator includes a tuning electrode and a compliant membrane spaced from the tuning electrode so as to define a cavity therebetween. The compliant membrane is deformable in response to an electrostatic force. A light absorbing fluid is received in the cavity. A pinning electrode has a dimension and is disposed in the cavity between the tuning electrode and the compliant membrane. The pinning electrode is aligned with a first portion of the compliant membrane. A light blocker has a dimension greater than the dimension of the pinning electrode and is disposed in the cavity between the tuning electrode and the pinning electrode. Energization of the pinning electrode generates the electrostatic force on the compliant membrane and causes the first portion of the compliant membrane to deform toward the pinning electrode so as to displace the light absorbing fluid between the first portion of the compliant membrane and the pinning electrode.

The compliant membrane further includes a second portion having a dimension. Energization of the tuning electrode causes the second portion of the compliant membrane to deform towards the tuning electrode and displace the light absorbing fluid from between the second portion of the compliant membrane and the tuning electrode. The dimension of the second portion of the compliant membrane deformed varies in response to a magnitude of the energization of the tuning electrode. A first voltage source may be operatively connected to the pinning electrode. The first voltage source selectively generates a voltage to energize the pinning electrode. A second voltage source may be operatively connected to the tuning electrode. The second voltage source selectively generates a voltage having a desired magnitude to energize the tuning electrode.

The tuning electrode is transparent. An insulator has a first portion disposed between the pinning electrode and the light absorbing fluid and a second portion disposed between the tuning electrode and the light absorbing fluid. A transparent panel is adapted for receiving the tuning electrode thereon. The compliant membrane may be electrically conductive.

In accordance with a further aspect of the present invention, a light modulator is provided. The light modulator includes a membrane having a central portion and an outer portion projecting radially from the central portion. A tuning electrode is in spaced relation to the membrane and a fluid is received between the tuning electrode and the membrane. A light blocker is positioned between the tuning portion and the central portion of the membrane. A first electrostatic generator is configured to selectively apply a variable electrostatic force on the membrane causing the fluid to be displaced from between the membrane and the tuning electrode.

A pinning electrode has a dimension disposed between the light blocker and the membrane. The pinning electrode is aligned with the central portion of the membrane. A second electrostatic generator is configured to selectively apply an electrostatic force on the membrane, thereby causing the central portion of the membrane to deform towards the pinning electrode.

The light blocker has a dimension greater than the dimension of the pinning electrode. The first electrostatic generator is configured to selectively apply a variable electrostatic force on the membrane, thereby causing the outer portion of the membrane to deform towards the tuning electrode and displace the fluid from between the membrane and the tuning electrode. The outer portion of the membrane deformed has a dimension. The dimension of the outer portion of the membrane deformed varies in response to a magnitude of the variable electrostatic force applied to the membrane.

The first electrostatic generator includes a voltage source operatively connected to the tuning electrode. The voltage source selectively generates a voltage having a desired magnitude. The tuning electrode is transparent. An insulator is disposed between the turning electrode and the fluid and between the tuning electrode and the light blocker. A transparent panel is adapted for receiving the tuning electrode thereon.

In accordance with a still further aspect of the present invention, a method of forming a light modulator is provided. The method includes the step of spacing a tuning electrode from a membrane so as to define a cavity therebetween. The membrane is deformable in response to an electrostatic force. The cavity is filled with a light absorbing fluid. The light absorbing fluid prevents light from passing therethrough. A pinning electrode is aligned with a central portion of the membrane. A first electrostatic force is generated on the membrane such that the central portion of the membrane deforms towards the pinning electrode and displaces the light absorbing fluid from between the central portion of the membrane and the pinning electrode. When the central portion of the membrane is deformed towards the pinning electrode, light is blocked from passing through from between the membrane and the pinning electrode with a light blocker. A variable electrostatic force is generated on the membrane such that an outer portion of the membrane, extending radially from the central portion of the membrane, deforms towards the tuning electrode and displaces the light absorbing fluid from between the outer portion of the membrane and the tuning electrode so as to allow light to pass through the outer portion of membrane.

The outer portion of the membrane has a dimension. The dimension of the outer portion of the membrane deformed varies in response to a magnitude of the variable electrostatic force on the membrane. The tuning electrode is transparent and may be on a transparent panel. An insulator may be provided between the tuning electrode and the light absorbing fluid.

The first electrostatic force is generated on the membrane by a first voltage source operatively connected between the pinning electrode and the membrane for exciting the pinning electrode. The variable electrostatic force is generated on the membrane by a second voltage source operatively connected between the tuning electrode and the membrane for exciting the tuning electrode.

BRIEF DESCRIPTION OF THE DRAWINGS

The drawings furnished herewith illustrate a preferred methodology of the present invention in which the above advantages and features are clearly disclosed as well as others which will be readily understood from the following description of the illustrated embodiment.
In the drawings:
FIG. 1 is a top plan view of a light modulator in accordance with the present invention in a non-activated state;
FIG. 2 is a cross-sectional view of the light modulator taken along line 2-2 of FIG. 1;
FIG. 3 is a top plan view of the light modulator of the present invention in an initial activated state;
FIG. 4 is a cross-sectional view of the light modulator taken along line 4-4 of FIG. 3;
FIG. 5 is a top plan view of the light modulator of the present invention in an intermediate activated state;
FIG. 6 is a cross-sectional view of the light modulator taken along line 6-6 of FIG. 5;
FIG. 7 is a top plan view of the light modulator of the present invention in a fully activated state;
FIG. 8 is a cross-sectional view of the light modulator taken along line 8-8 of FIG. 7;
FIG. 9 is a top plan view of an alternate embodiment of a light modulator in accordance with the present invention in a non-actuated state;
FIG. 10 is a cross-sectional view of the light modulator taken along line 10-10 of FIG. 9;
FIG. 11 is a top plan view of the light modulator of the present invention in an initial activated state;
FIG. 12 is a cross-sectional view of the light modulator taken along line 12-12 of FIG. 11;
FIG. 13 is a top plan view of the light modulator of the present invention in an intermediate activated state;
FIG. 14 is a cross-sectional view of the light modulator taken along line 14-14 of FIG. 13;
FIG. 15 is a top plan view of the light modulator of the present invention in a fully activated state; and
FIG. 16 is a cross-sectional view of the light modulator taken along line 16-16 of FIG. 15.

DETAILED DESCRIPTION OF THE DRAWINGS

Referring to FIG. 1, a light modulator in accordance with the present invention is generally designated by the reference numeral 10. Light modulator 10 includes transparent substrate 12 defined by first and second sides 14 and 16, respectively, interconnected by first and second ends (not shown). As described, light modulator 10 has a generally rectangular, box-like configuration. However, it can be appreciated that light modulator 10 may have other configurations without deviating from the scope of the present invention. Light modulator 10 further includes a transparent, compliant, electrically conductive membrane 22 spaced from substrate 12. More specifically, membrane 12 is defined by first and second sides 18 and 20, respectively, interconnected by first and second ends 28 and 30, respectively. Membrane 22 further includes upper surface 32 and lower surface 34.

Radially outer edge 35 of membrane 22 is interconnected to substrate 12 by anchor 36. Anchor 36 is defined by lower surface 46 bonded to upper surface 42 of substrate 12 and upper surface 48 interconnected by inner and outer surfaces 50 and 52, respectively. By way of example, anchor 36 has a generally ring-like structure having rectangular configuration. However, other configurations are possible without deviating from the scope of the present invention. Inner surface 50 of anchor 36 is bonded to peripheral outer edge 35 of membrane 22 and interconnects membrane 22 to upper surface 42 of substrate 12 in spaced relation.

Light modulator 10 further includes transparent tuning electrode 54 provided on and extending along upper surface 42 of substrate 12 between first and second sides 14 and 16, respectively, and the first and second ends thereof. More specifically, it is contemplated for tuning electrode 54 to be a planar electrode having a central portion 56 axially aligned with central portion 58 of membrane 22, for reasons hereinafter described, and a radially outer portion 59 extending from central portion 56 to anchor 36. Tuning electrode 54 includes upper surface 60 directed towards lower surface 34 of membrane 22 and lower surface 62 in engagement with upper surface 42 of substrate 12.

Light blocker 64 is positioned on membrane 22 such that lower surface 66 of light blocker 64 engages upper surface 60 of tuning electrode 54 and overlaps central portion 56 thereof. Light blocker 64 has a center 65, a generally circular configuration and a diameter D1. However, other configurations are possible without deviating from the scope of the present invention. In the depicted embodiment, light blocker 64 is further defined by upper surface 68 aligned with and directed towards central portion 58 of membrane 22. Lower and upper surfaces 66 and 68, respectively, of light blocker 64 are interconnected by outer edge 70. It is intended for light blocker 64 to prevent light from passing therethrough. Further, it is intended for light blocker 64 to be fabricated from an electrical insulating material to electrically isolate tuning electrode 54 from pinning electrode 72, for reasons hereinafter after described.

Light modulator 10 further includes a generally circular, pinning electrode 72 positioned on light blocker 64 such that lower surface 76 of pinning electrode 72 engages upper surface 66 of light blocker 64. Pinning electrode 72 has a center 74 coaxial with center 65 of light blocker 64, a generally circular configuration and a diameter D2 which is less than or equal to diameter D1 of light blocker 64, for reasons hereinafter described. Other configurations are possible without deviating from the scope of the present invention. In the depicted embodiment, pinning electrode 72 is further defined by upper surface 78 aligned with and directed towards central portion 58 of membrane 22. Lower and upper surfaces 76 and 78, respectively, of pinning electrode 72 are interconnected by outer edge 80. It is intended for pinning electrode 72 to prevent light from passing therethrough. Further, it can be appreciated that pinning electrode 72 may be embedded in upper surface 68 of light blocker 64 without deviating for the scope of the present invention.

Insulation layer 82 is fabricated from an electrical insulator and is deposited over pinning electrode 72, light blocker 64 and tuning electrode 54 to electrically isolate pinning electrode 72 and tuning electrode 54 from membrane 22. More specifically, insulation layer 82 includes lower surface 84 positioned on upper surface 78 of pinning electrode 72, portion 86 of upper surface 68 of light blocker 64 extending out from beyond outer edge 80 of pinning electrode 72, and portion 88 of upper surface 60 of tuning electrode 54 extending beyond outer edge 70 of light blocker 64; an upper surface 90 directed towards lower surface 34 of membrane 22; and an outer edge 92 interconnected lower and upper surfaces 84 and 90, respectively, of insulation layer 82. Outer edge 92 engages and is bonded to inner surface 50 of anchor 36 so as to define fluid chamber 94 between lower surface 34 of membrane 32, upper surface 90 of insulation layer 82 and inner surface 50 of anchor 36. Fluid chamber 94 is adapted to receive a light absorbing dielectric ink 96 therein, for reasons hereinafter described. It can be understood that light absorbing dielectric ink 96 in fluid chamber 94 of light modulator 10 blocks light rays from passing therethrough.

For reasons hereinafter described, first voltage source 100 is operatively connected between pinning electrode 72 and membrane 22 and second voltage source 102 is operatively connected between tuning electrode 54 and membrane 22 for exciting tuning electrode 54. First voltage source 100 has a first deactivated state wherein no voltage is supplied between pinning electrode 72 and membrane 22, FIGS. 1-2, and a second, activated state wherein first voltage source supplies a voltage across pinning electrode 72 and membrane 22 for exciting pinning electrode 72, FIGS. 3-4. Similarly, second voltage source 102 has a first deactivated state wherein no voltage is supplied between tuning electrode 54 and membrane 22, FIGS. 3-4, and a second, activated state wherein second voltage source 102 supplies a voltage across tuning electrode 54 and membrane 22 for exciting tuning electrode 54, FIGS. 5-8.

In operation, light rays 110 may be directed towards substrate 12 of light modulator 10. With light modulator 10 in an unactuated state, it can be understood that light absorbing dielectric ink 96 in fluid chamber 94 of light modulator 10 blocks all light rays 110 incident on lower surface 116 of substrate 110 from passing through light modulator 10, FIGS. 1-2. Thereafter, to provide light modulator 10 in an activated light blocking state, first voltage source 100 is transitioned from the deactivated state to the activated state wherein a voltage is provided by first voltage source 100 across pinning electrode 72 and membrane 22. Excitation of pinning electrode 72 by first voltage source 100 generates a first electrostatic force on membrane 22 such that the first electrostatic force exerted on membrane 22 causes central portion 58 of membrane 22 to deform towards pinning electrode 72 and displace light absorbing dielectric ink 96 from between central portion 58 of membrane 22 and pinning electrode 72. When the central portion of membrane 22 is deformed toward pinning electrode 72 and pinned on insulator 82, light blocker 64 continues to prevent light rays 110 from passing through from between membrane 22 and pinning electrode 22, FIGS. 3-4.

To provide light modulator 10 in an activated, light transmission state and allow all or a portion of light rays 110 to pass therethrough, second voltage source 102 is transitioned from the deactivated state to the activated state wherein a voltage is provided by second voltage source 102 across turning electrode 54 and membrane 22. Excitation of tuning electrode 54 by second voltage source 102 exerts a second electrostatic force on membrane 22 such that radially outer portion 112 of membrane 22, extending from central portion 58 to radially outer edge 35, further collapses towards outer portion 59 of tuning electrode 54 in a zipper-like motion toward anchor 36, FIGS. 5-6. As outer portion 112 of membrane 22 collapses onto tuning electrode 54 towards anchor 36, light absorbing dielectric ink 96 is displaced from between membrane 22 and tuning electrode 54. As such, portion 114 of light rays 110 incident on lower surface 116 of substrate 12 is allowed to pass through transparent area 118 of light modulator 10 radially spaced from light blocker 64 and from which light absorbing dielectric ink 96 is displaced from between membrane 22 and tuning electrode 54. By increasing the voltage applied by second voltage source 102 across turning electrode 54 and membrane 22, it can be appreciated that dimension of transparent area 118 may be correspondingly increased to allow an increased portion 114 of light rays 110 to pass through light modulator 10, FIGS. 7-8. It can be appreciated that by varying the voltage applied by second voltage source 102 across turning electrode 54 and membrane 22, transparent area 118 may be varied to a desired dimension, thereby controlling portion 114 of light rays 110 passing through light modulator 10. As such, light modulator 10 acts as a tunable optical valve.

Referring to FIGS. 9-16, in an alternate arrangement, membrane 22 of light modulator 10 acts as an insulator. As such, in order to cause deformation of membrane 22, as heretofore described, light modulator 10 includes transparent cover 120 corresponding in size and shape to substrate 12. Cover 120 is defined by upper surface 122 and lower surface 124. Seal 126 is positioned adjacent the outer periphery of cover 120 and interconnects/sealably bonds lower surface 124 of cover 120 to upper surface 48 of anchor 36 so as to define second fluid chamber 128 between lower surface 124 of cover 120, upper surface 32 of membrane 22 and inner surface 50 of anchor 36. Second fluid chamber 128 is adapted by receiving a transparent conductive fluid, such as salinized water, therein, for reasons hereinafter described.

First voltage source 100 is operatively connected between pinning electrode 72 and the conductive fluid in second fluid chamber 128 for exiting pinning electrode 72 and second voltage source 102 is operatively connected between tuning electrode 54 and the conductive fluid in second fluid chamber 128 for exciting tuning electrode 54. First voltage source 100 has a first deactivated state wherein no voltage is supplied between pinning electrode 72 and the conductive fluid in second fluid chamber 128, FIGS. 9-10, and a second, activated state wherein first voltage source 100 supplies a voltage across pinning electrode 72 and the conductive fluid in second fluid chamber 128 for exciting pinning electrode 72, FIGS. 11-12. Similarly, second voltage source 102 has a first deactivated state wherein no voltage is supplied between tuning electrode 54 and the conductive fluid in second fluid chamber 128, FIGS. 9-12, and a second, activated state wherein second voltage source 102 supplies a voltage across tuning electrode 54 and the conductive fluid in second fluid chamber 128 for exciting tuning electrode 54, FIGS. 13-16.

In operation, light rays 110 may be directed towards substrate 12 of light modulator 10. With light modulator 10 in an unactuated state, it can be understood that light absorbing dielectric ink 96 in fluid chamber 94 of light modulator 10 blocks all light rays 110 incident on lower surface 116 of substrate 110 from passing through light modulator, FIGS. 9-10. Thereafter, to provide light modulator 10 in an activated light blocking state, first voltage source 100 is transitioned from the deactivated state to the activated state wherein a voltage is provided by first voltage source 100 across pinning electrode 72 and the conductive fluid in second fluid chamber 128. Excitation of pinning electrode 72 by first voltage source 100 generates a first electrostatic force on the conductive fluid in second fluid chamber 128 such that the first electrostatic force exerted on the conductive fluid in second fluid chamber 128 causes the conductive fluid in second fluid chamber 128 to be drawn towards pinning electrode 72, thereby deforming central portion 58 of membrane 22 toward pinning electrode 72. Membrane 22 collapses onto insulator 82 and displaces light absorbing dielectric ink 96 from between central portion 58 of membrane 22 and pinning electrode 72, FIGS. 11-12. When the central portion of membrane 22 is deformed towards pinning electrode 72, light blocker 64 continues to prevent light rays 110 from passing through from between membrane 22 and pinning electrode 22.

To provide light modulator 10 in an activated, light transmission state and allow all or a portion of light rays 110 to pass through light modulator 10, second voltage source 102 is transitioned from the deactivated state to the activated state wherein a voltage is provided by second voltage source 102 across turning electrode 54 and the conductive fluid in second fluid chamber 128. Excitation of tuning electrode 54 by second voltage source 102 exerts a second electrostatic force on the conductive fluid in second fluid chamber 128 thereby causing the conductive fluid in second fluid chamber 128 to be drawn towards tuning electrode 72 such that radially outer portion 112 of membrane 22, extending from central portion 58 to radially outer edge 35, further collapses towards outer portion 59 of tuning electrode 54 in a zipper-like motion towards anchor 36, FIGS. 13-14. As outer portion 112 of membrane 22 collapses onto tuning electrode 54 towards anchor 36, light absorbing dielectric ink 96 is displaced from between membrane 22 and tuning electrode 54. As such, portion 114 of light rays 110 incident on lower surface 116 of substrate 12 is allowed to pass through transparent area 118 of light modulator 10 radially spaced from light blocker 64 and from which light absorbing dielectric ink 96 is displaced from between membrane 22 and tuning electrode 54. By increasing the voltage applied by second voltage source 102 across turning electrode 54 and the conductive fluid in second fluid chamber 128, it can be appreciated that dimension of transparent area 118 may be correspondingly increased to allow an increased portion 114 of light rays 110 to pass through light modulator 10, FIGS. 15-16. It can be appreciated that by varying the voltage applied by second voltage source 102 across turning electrode 54 and the conductive fluid in second fluid chamber 128, transparent area 118 may be varied to a desired dimension, thereby controlling portion 114 of light rays 110 passing through light modulator 10. As such, light modulator 10 acts as a tunable optical valve.

Various modes of carrying out the invention are contemplated as being within the scope of the following claims particularly pointing out and distinctly claiming the subject matter that is regarded as the invention.

We claim:
1. A light modulator, comprising:
 a tuning electrode;
 a compliant membrane spaced from the tuning electrode so as to define a cavity therebetween, the compliant membrane being deformable in response to an electrostatic force;
 a light absorbing fluid received in the cavity;
 a pinning electrode having a dimension and being disposed in the cavity between the tuning electrode and the compliant membrane, the pinning electrode being aligned with a first portion of the compliant membrane; and
 a light blocker having a dimension greater than the dimension of the pinning electrode and being disposed in the cavity between the tuning electrode and the pinning electrode;
wherein:
 energization of the pinning electrode generates the electrostatic force on the compliant membrane and causes the first portion of the compliant membrane to deform towards the pinning electrode so as to displace the light absorbing fluid between the first portion of the compliant membrane and the pinning electrode.

2. The light modulator of claim 1 wherein:
the compliant membrane includes a second portion having a dimension; and
energization of the tuning electrode causes the second portion of the compliant membrane to deform towards the tuning electrode and displace the light absorbing fluid from between the second portion of the compliant membrane and the tuning electrode.

3. The light modulator of claim 2 wherein the dimension of the second portion of the compliant membrane deformed varies in response to a magnitude of the energization of the tuning electrode.

4. The light modulator of claim 1 further comprising a voltage source operatively connected to the tuning electrode, the voltage source selectively generating a voltage having a desired magnitude to energize the tuning electrode.

5. The light modulator of claim 1 further comprising a first voltage source operatively connected to the pinning electrode, the first voltage source selectively generating a voltage to energize the pinning electrode.

6. The light modulator of claim 5 further comprising a second voltage source operatively connected to the tuning electrode, the second voltage source selectively generating a voltage having a desired magnitude to energize the tuning electrode.

7. The light modulator of claim 1 wherein the tuning electrode is transparent.

8. The light modulator of claim 1 further comprising an insulator having a first portion disposed between the pinning electrode and the light absorbing fluid.

9. The light modulator of claim 8 wherein the insulator has a second portion disposed between the tuning electrode and the light absorbing fluid.

10. The light modulator of claim 1 further comprising a transparent panel adapted for receiving the tuning electrode thereon.

11. The light modulator of claim 1 further comprising:
a first voltage source operatively connected between the pinning electrode and the compliant membrane for exciting the pinning electrode; and
a second voltage source operatively connected between the tuning electrode and the compliant membrane to excite the tuning electrode and generate a variable electrostatic force on the compliant membrane, the variable electrostatic force causing a second portion of compliant membrane to deform towards the tuning electrode;
wherein:
the compliant membrane is electrically conductive.

12. A light modulator, comprising:
a membrane having a central portion and an outer portion projecting radially from the central portion;
a tuning electrode in spaced relation to the membrane and axially aligned with the central portion of the membrane;
a fluid received between the tuning electrode and the membrane;
a light blocker positioned between the tuning electrode and the central portion of the membrane, the position of the light blocker being unmovable and fixed relative to the tuning electrode;
a first electrostatic generator configured to selectively apply a variable electrostatic force on the membrane causing the fluid to be displaced from between the membrane and the tuning electrode;
a pinning electrode having a dimension disposed between the light blocker and the membrane, the pinning electrode being aligned with the central portion of the membrane; and
a second electrostatic generator configured to selectively apply an electrostatic force on the membrane causing the central portion of the membrane to deform towards pinning electrode.

13. The light modulator of claim 12 wherein the light blocker has a dimension greater than the dimension of the pinning electrode.

14. The light modulator of claim 12 wherein the first electrostatic generator configured to selectively apply a variable electrostatic force on the membrane causes the outer portion of the membrane to deform towards tuning electrode thereby displacing the fluid from between the membrane and the tuning electrode.

15. The light modulator of claim 14 wherein the outer portion of the membrane deformed has a dimension and wherein the dimension of the outer portion of the membrane deformed varies in response to a magnitude of the variable electrostatic force applied to the membrane.

16. The light modulator of claim 14 wherein the first electrostatic generator includes a voltage source operatively connected to the tuning electrode, the voltage source selectively generating a voltage having a desired magnitude.

17. The light modulator of claim 12 wherein the tuning electrode is transparent.

18. The light modulator of claim 12 further comprising an insulator disposed between the tuning electrode and the fluid.

19. The light modulator of claim 18 wherein the insulator is disposed between the tuning electrode and the light blocker.

20. The light modulator of claim 12 further comprising a transparent panel adapted for receiving the tuning electrode thereon.

21. A method of forming a light modulator, comprising the steps of:
spacing a tuning electrode from a membrane so as to define a cavity therebetween, the tuning electrode being axially aligned with a central portion of the membrane and the membrane being deformable in response to an electrostatic force;
filling the cavity with a light absorbing fluid, the light absorbing fluid preventing light from passing therethrough;
aligning a pinning electrode with the central portion of the membrane;
positioning a light blocker between the pinning electrode and the tuning electrode, the light blocker being maintained in a fixed position relative to the pinning electrode such that the light blocker is unmovable relative to the pinning electrode; and
generating a first electrostatic force such that the central portion of the membrane deforms toward the pinning electrode and displaces the light absorbing fluid from between the central portion of the membrane and the pinning electrode;
when the central portion of the membrane is deformed toward the pinning electrode, blocking light from passing through from between membrane and the pinning electrode with the light blocker;
generating a variable electrostatic force such that an outer portion of the membrane, extending radially from the central portion of the membrane, deforms toward the tuning electrode and displaces the light absorbing fluid from between the outer portion of the membrane and the tuning electrode so as to allow light to pass through the outer portion of membrane.

22. The method of claim 21 wherein the outer portion of the membrane has a dimension, the dimension of the outer portion of the membrane deformed varies in response to a magnitude of the variable electrostatic force on the membrane.

23. The method of claim 21 wherein the tuning electrode is transparent.

24. The method of claim 21 comprising the additional step of providing an insulator between the tuning electrode and the light absorbing fluid.

25. The method of claim 21 comprising the additional step of positioning the tuning electrode on a transparent panel.

26. The method of claim 21 wherein:
   the first electrostatic force is generated on the membrane by a first voltage source operatively connected between the pinning electrode and the membrane for exciting the pinning electrode; and
   the variable electrostatic force is generated on the membrane by a second voltage source operatively connected between the tuning electrode and the membrane for exciting the tuning electrode.

27. The method of claim 21 wherein the first electrostatic force and the variable electrostatic force are exerted on the membrane.

* * * * *